(No Model.)  2 Sheets—Sheet 1.
A. T. ARNOLD.
Friction Pulley.
No. 233,181.  Patented Oct. 12, 1880.
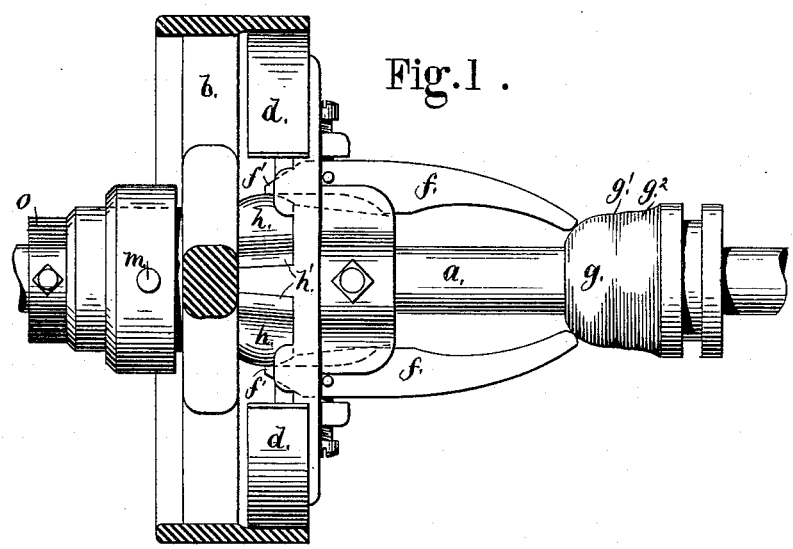
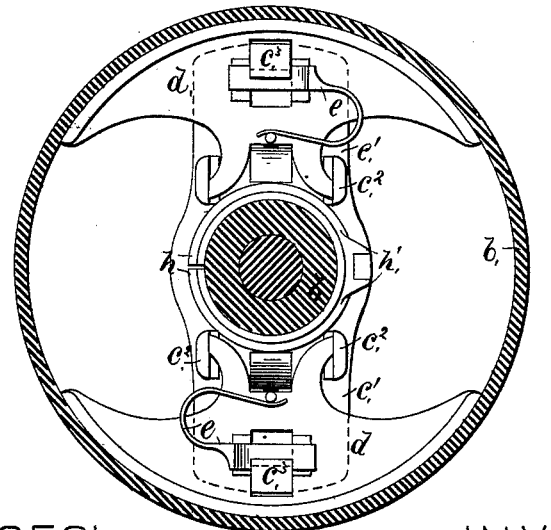
WITNESSES:  INVENTOR:

(No Model.) 2 Sheets—Sheet 2.

A. T. ARNOLD.
Friction Pulley.

No. 233,181. Patented Oct. 12, 1880.

WITNESSES:
Wm. L. Coe
H. A. Briel

INVENTOR:
Adney T Arnold
by Joseph A. Miller
Atty

UNITED STATES PATENT OFFICE.

ADNEY T. ARNOLD, OF FITCHBURG, MASSACHUSETTS.

FRICTION-PULLEY.

SPECIFICATION forming part of Letters Patent No. 233,181, dated October 12, 1880.

Application filed August 5, 1880. (No model.)

*To all whom it may concern:*

Be it known that I, ADNEY T. ARNOLD, of Fitchburg, in the county of Worcester and State of Massachusetts, have invented a new and useful Improvement in Friction-Pulleys; and I hereby declare that the following is a full, clear, and exact description of the same, reference being had to the accompanying drawings, forming part of this specification.
This invention has reference to an improvement in the construction of friction-clutches arranged to connect and disconnect a loose pulley with the driving-shaft, so that a machine can be readily stopped or started without the use of loose and tight pulleys and without shipping the belt.

The object of this invention is to provide for the ready adjustment of the shoes, so that both will bear with equal force on the pulley.
Another object of this invention is to increase the frictional resistance and regulate the amount of the frictional adhesion.

The invention consists in providing the friction-pulley with a split fulcrum-ring and in the peculiar and novel construction of the parts, as will be more fully set forth hereinafter.

Figure 3:
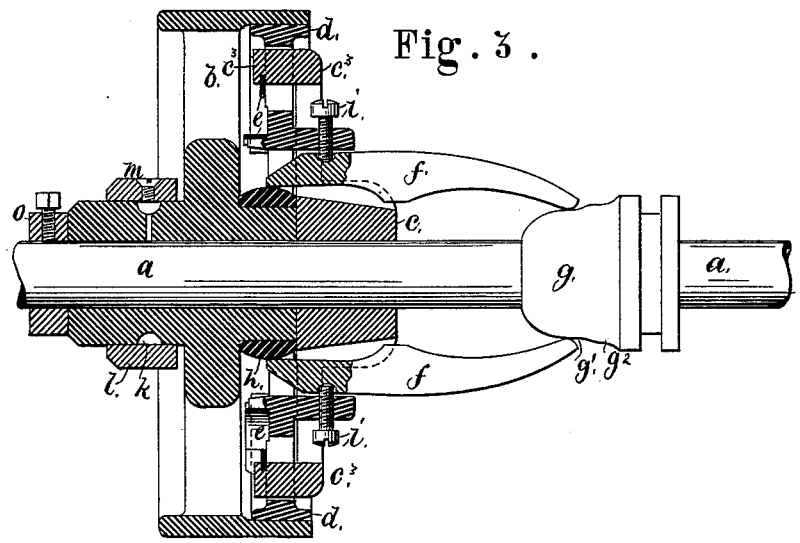
Figure 4:
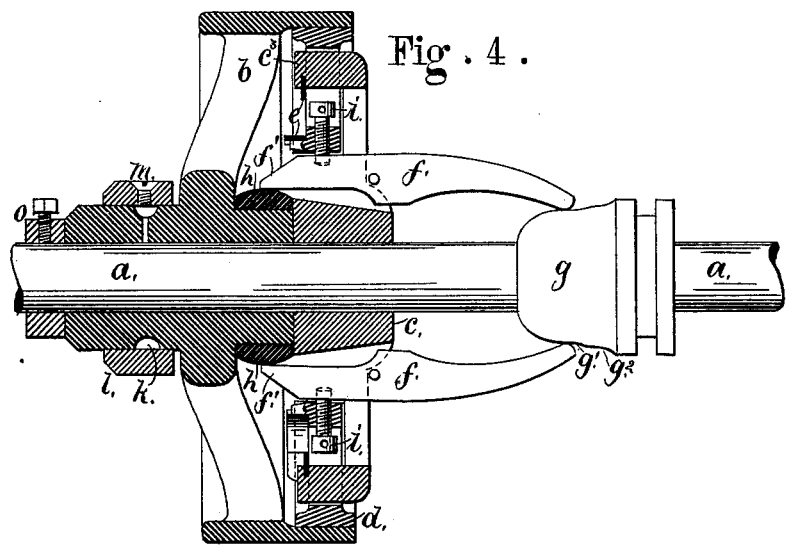

Figure 1 is a view, partly in section, showing the friction-clutch, the levers, and the cone for spreading the same. Fig. 2 is a sectional view at right angle with the line of the shaft through the pulley, showing the segmental shoes, the springs for releasing the same, and the split friction-ring. Fig. 3 is a sectional view, showing the arrangement for oiling the loose pulley, the operating-levers, and the adjusting-screws, the split ring forming the fulcrum for the operating-levers, and the shipper-cone. Fig. 4 is a sectional view of the same device as Fig. 3. The arms of the pulley are shown curved, so as to bring the bearing of the split ring practically into the center of the pulley, and the bearing of the levers practically on a line with the segmental friction-shoes.

Similar letters of reference indicate corresponding parts in all the figures.

In the drawings, $a$ represents the driving-shaft, on which the loose pulley $b$ is mounted so as to allow the shaft to turn without turning the pulley.

$c$ is a boss or hub from which the two arms $c'$ extend. These arms are provided with the way $c^2$, in which the segmental friction-shoes $d\ d$ slide. The arms $c'$ are also provided with the projection $c^3$ at their ends, extending through slits in the segmental shoes, and the spring $e$, resting in a slot of the projection $c^3$, acts upon a pin on the segmental shoes $d$ so as to keep the said shoes from contact with the rim of the pulley.

$f\ f$ are the operating-levers, which, when forced apart by the cone $g$, will press the segmental shoes against the inner rim of the loose pulley, as the arms $c'$ and hub $c$ are secured to the shaft, and the segmental friction-shoes $d$ revolve with the same. As soon as they are forced against the rim of the pulley the pulley will be carried around with the shaft. It is not new, however, to connect a loose pulley with the shaft by means of segmental shoes pressed against the rim of the pulley by means of levers operated by a cone, nor is it new to release the shoe by springs, all such devices having been used; but in friction-clutches as heretofore constructed the levers were hinged to fixed pins secured to the arms, and the cones were made of uniform taper. Such friction-clutches were not as readily adjustable, and were not provided with a friction-ring on which the short ends of the operating-levers rest, as is the case in my improved friction-pulley.

It is desirable to hold the loose pulley by the friction-clutch so that for ordinary work the pulley will drive the machine, but will allow the friction-clutch to slip when extra strain is exerted, and yet be able to exert additional force to hold the friction-clutch when such extra strain is required. For this purpose I turn the cone $g$ with the rest or shoulder $g'$, on which the ends of the levers $f f$ rest, when the ordinary strains are used, and also with the second rest or shoulder, $g^2$, when extra strain is required.

The levers $f f$ are not hinged to a fixed fulcrum, but the forward ends or toes, $f'$, rest on the split ring $h$. This ring surrounds the finished hub of the loose pulley and is prevented from turning by the shoulders $h'$, resting against a projection of the hub $c$.

The split ring forms the fulcrum of the levers $f$. The segmental friction-shoes $d\,d$ are provided with the adjusting-screws $i\,i$, which rest on the levers $f$, and when, now, the levers are forced apart by the cone $g$ entering between the same, the toes will compress the split ring $h$ and form a frictional contact with the hub, while the segmental friction-shoes are pressed against the inner face of the rim on the loose pulley. All the friction-surfaces are turned true and finished—that is to say, the inner surface of the rim on the pulley, the segmental shoes, the inner face of the split ring, and the hub are finished so as to form a true frictional bearing.

The loose pulley is provided with an oil-reservoir consisting of the annular groove $k$, connected by one or more holes with the bearing on the shaft. The ring $l$ is forced over the groove $k$, so that an annular channel is formed in which the oil is contained and is held when the pulley revolves, but is free to flow to the shaft when the pulley is stationary.

The screw $m$ closes the inlet by which oil is poured into the channel $k$, and for the purpose of cleaning the ring $l$ can be forced on one side until the groove $k$ is exposed.

$o$ represents a collar secured to the shaft to prevent lateral displacement of the pulley $b$.

Having thus described my invention, I claim as new and desire to secure by Letters Patent—

1. In a friction-pulley, the combination, with a loose pulley, segmental friction-shoes, and a split ring encircling the hub of said pulley, of levers adapted to fulfill the twofold office of throwing the segmental shoes in engagement with the inner face of the pulley, and of forcing the split ring in engagement with the hub thereof, substantially as set forth.

2. In a friction-pulley, the combination, with a fixed hub having lateral arms, projections secured to said arms, and segmental shoes provided with elongated slots through which the projections extend, of pins secured to the segmental shoes, and springs mounted in the projections and engaging with the pins to retain the shoes from engagement with the inner face of the loose pulley, substantially as set forth.

3. The combination, with the loose pulley $b$, of the split ring $h$, constructed to form a bearing for the levers of a friction-clutch, as described.

4. The combination, with the loose pulley $b$ and the split ring $h$, of the levers $f\,f$ and cone $g$, constructed to force the friction-shoes against the rim of the loose pulley, and the split ring against the hub of the same, as described.

5. The combination, with the loose pulley $b$ and the cone $g$, of the hub $c$, fixed to the shaft and provided with the arms $c'$, the segmental frictional shoes $d$, the split ring $h$, and levers constructed to connect the loose pulley with, and disconnect the same from, the driving-pulley, as described.

ADNEY T. ARNOLD.

Witnesses:
AARON F. WHITNEY,
HENRY H. WOOD.